United States Patent [19]

Nakadoi

[11] Patent Number: 4,495,701
[45] Date of Patent: Jan. 29, 1985

[54] DIGITAL INDICATION TYPE MICROMETERHEAD

[75] Inventor: Tetsuya Nakadoi, Hiroshima, Japan

[73] Assignee: Mitutoyo Mfg. Co., Ltd., Tokyo, Japan

[21] Appl. No.: 479,337

[22] Filed: Mar. 28, 1983

[30] Foreign Application Priority Data

Mar. 31, 1982 [JP] Japan .............................. 57-46364[U]

[51] Int. Cl.³ ............................. G01B 3/18; G01B 7/02
[52] U.S. Cl. ........................................ 33/166; 33/170; 33/172 E
[58] Field of Search ...................... 33/147 N, 166, 170, 33/172 E

[56] References Cited

U.S. PATENT DOCUMENTS

| | | | |
|---|---|---|---|
| 3,924,337 | 12/1975 | Taylor | 33/172 E |
| 4,103,427 | 8/1978 | Ledley | 33/166 |
| 4,255,861 | 3/1981 | Nakata et al. | 33/166 |

FOREIGN PATENT DOCUMENTS

| | | | |
|---|---|---|---|
| 44823 | 1/1982 | European Pat. Off. | 33/166 |
| 47463 | 3/1982 | European Pat. Off. | 33/166 |
| 2028508 | 3/1980 | United Kingdom | 33/166 |
| 2073419 | 10/1981 | United Kingdom | 33/166 |

*Primary Examiner*—Richard R. Stearns
*Attorney, Agent, or Firm*—Koda and Androlia

[57] ABSTRACT

A digital indication type micrometer head with a spindle moved axially by the rotation of a thimble through a screw feed mechanism to a detector for detecting axial motion of the spindle, a unit for processing signals from the detector and calculating a digital indication value, and a digital indicator secured to a casing surface to indicate calculated value. The digital indicator points upward and is rotatable along the casing surface and can take a normal position at the side of the forward end of the spindle and a position or positions rotated through substantially 90° or 180° from the normal position.

16 Claims, 7 Drawing Figures

DIGITAL INDICATION TYPE MICROMETERHEAD

BACKGROUND OF THE INVENTION

1. Field of the Invention

This invention relates to digital indication type micrometer heads, and more particularly to improvements in digital indication type micrometer heads secured to a mount on which a workpiece is mounted for measurement with readouts in a projector or the like.

2. Description of the Prior Art

Heretofore, a digital indication type micrometer head has comprised a spindle moved axially by rotation of a thimble through a screw feed mechanism; a displacement detector for detecting the movement of the spindle; a means for processing signals emitted from the displacement detector and calculating a digital value; and a digital indicator which displays the result of the displacement calculation.

Heads of such a digital indication type micrometer are secured to a mount on which the a workpiece to be measured is mounted in two feed directions, i.e., an X axis and a Y axis, respectively, thus providing a two-dimensional readout of the position two-dimensional directions of the mount.

With micrometer heads of the digital indication type, numerical values are easily read at the normal position of the digital indicators, differing from the case of a dial gauge. However, it is very difficult to read the numerical value when the micrometer head is disposed in a direction perpendicular to the normal position, i.e., in a position turned sideways through substantially 90° from the normal position, and misreading tends to occur.

Consequently, heretofore, the digital indicators of the digital indication type micrometer heads secured to the X axis and the Y axis of the mount have been turned 90° from each other, so that a worker can read the numerical values easily. In other words, each of the digital indication type micrometer heads has been exclusively used for the X axis or the Y axis, thus presenting the disadvantage that there has been no inter-changeability between them.

Furthermore, even if the digital indicators of the digital indication type micrometer heads each exclusively used for the X axis or the Y axis are positioned in the directions where the worker can easily read the numerical values, there is presented the disadvantage that, when the direction of measurement made by the worker is changed, it becomes difficult to read the numerical values of both the digital indication type micrometer heads for the X axis and the Y axis.

SUMMARY OF THE INVENTION

The present invention has been developed to obviate the above-described disadvantages of the prior art and has as its object the provision of a digital indication type micrometer head capable of being used for both the X axis and Y axis when used on the mount of a projector or the like, and of changing the positions of the numerical values indicated by the digital indicators, following the position of the worker when this position is changed, so that misreading can be prevented.

Another object of the present invention is to provide a digital indication micrometer head of simplified construction and capable of changing the position of the digital indicator, following the position of a measurer, without changing the construction to any great extent.

To achieve the above-described objects, the present invention provides in a digital indication type micrometer head of the type previously described a digital indicator secured such as to be rotatable along the surface of the casing so that the digital indicator can assume a normal position with a portion thereof at the side of the forward end of the spindle pointing downwardly and a position or positions turned sideways through substantially 90° from the normal position.

To achieve the above-described objects, the present invention provides, in the aforesaid digital indication type micrometer head, (1) a circularly arcuate groove centered about the rotational axis of the digital indicator formed either on one rear surface of the digital indicator or the surface of the casing opposed to the aforesaid rear surface, and a sliding pin on the other rear surface projecting into the circularly arcuate groove and sliding; therein; (2) rotation away from the normal position of the digital indicator with a portion thereof at the side of the forward end of the spindle pointing upward, in the clockwise or counterclockwise direction; (3) a 180° range within which the digital indicator can rotate from the normal position; and (4) a ring-shaped leaf spring biasing the casing and the digital indicator in a direction where both these members are pressed against each other, so that frictional forces are generated in the direction of their relative to rotation.

BRIEF DESCRIPTION OF THE DRAWINGS

The exact nature of this invention, as well as other objects and advantages thereof, will be readily apparent from consideration of the accompanying drawings, in which like reference characters designate the same or similar parts throughout the figures thereof and wherein.

DETAILED DESCRIPTION OF THE PREFERRED EMBODIMENT

An embodiment of the present will be described with reference to the accompanying drawings.

Figure 1:
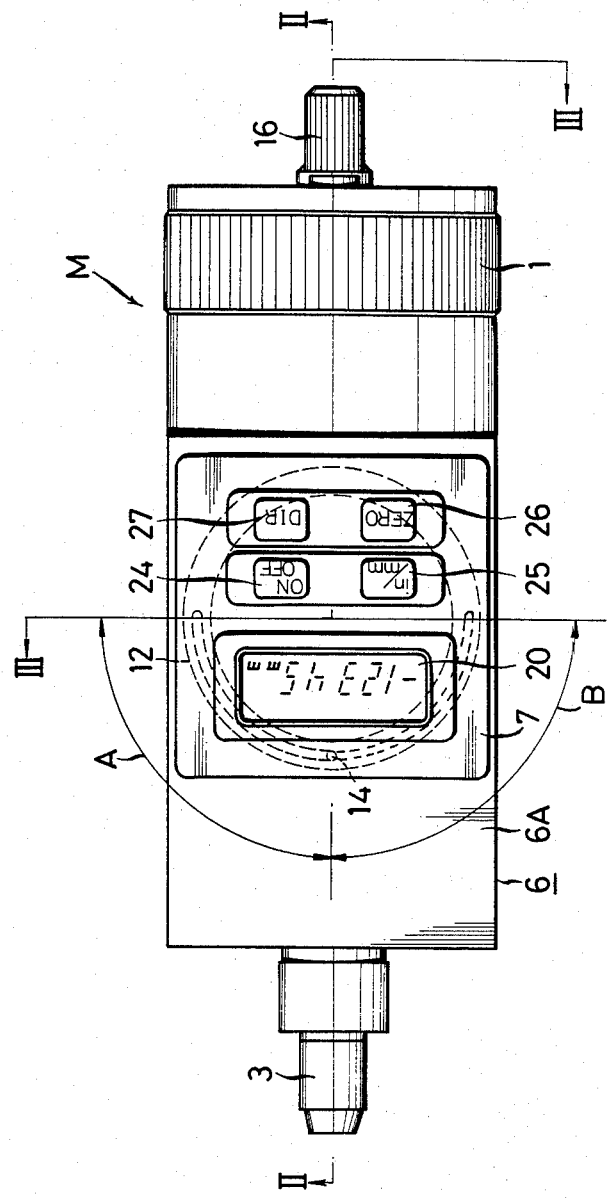
FIG. 1 is a plan view showing one embodiment of the digital indication type micrometer head according to the present invention.
Figure 2:
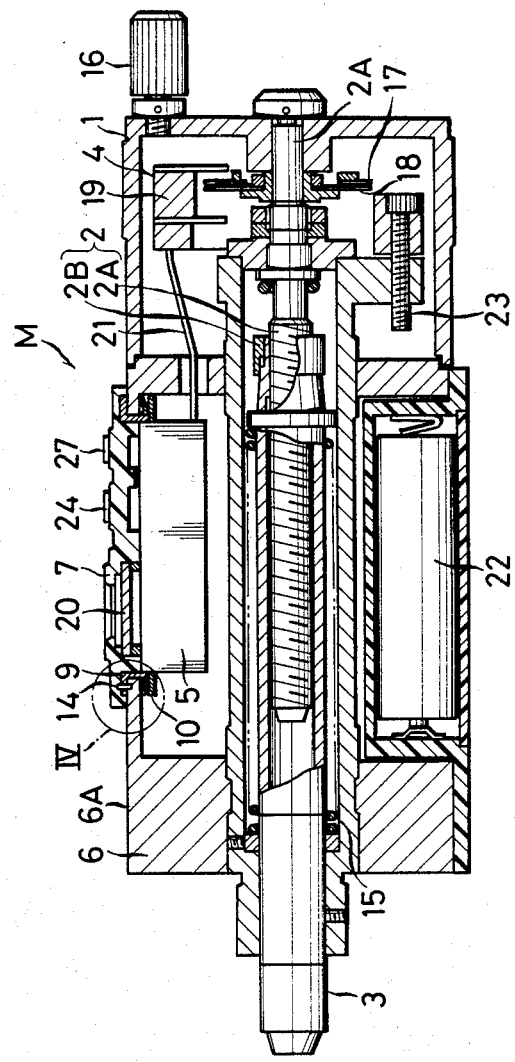
FIG. 2 is a sectional view taken along the line II—II in FIG. 1.

FIG. 1 and FIG. 2 show a digital indication type micrometer head M comprising a spindle 3 made displaceable in the axial direction thereof by rotation of a thimble 1 through a screw feed mechanism 2; a displacement detector 4 for detecting displacement values of the spindle 3; an operational means 5 for processing detection signals emitted from the displacement detector 4 and calculating a digital indication value; and a digital indicator 7 secured to a surface 6A of a casing 6 for indicating the result of calculation of the operational means 5. The digital indicator 7 is mounted so as to be rotatable along the surfaces 6A of the casing 6 so that the digital indicator 7 can take a normal position with a portion thereof at the side of the forward end of spindle 3 being disposed upwardly and a position or positions rotated through substantially 90° from the normal position, as shown by FIG. 1.

Figure 3:
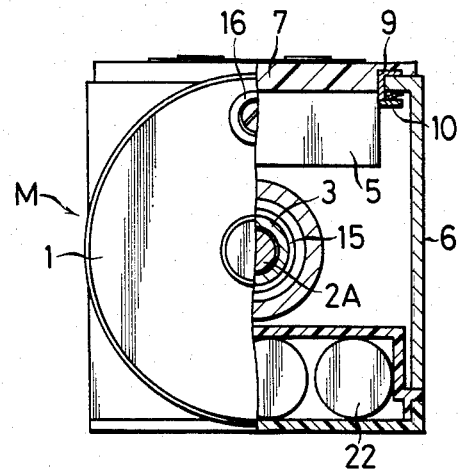
FIG. 3 is a sectional view taken along the line III—III in FIG. 1.
Figure 4:
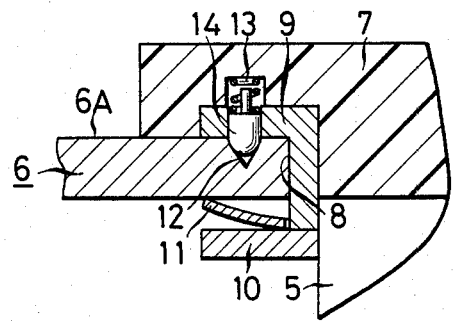
FIG. 4 is a sectional view showing an enlarged portion IV in FIG. 2.

Referring to FIG. 3 and FIG. 4, casing 6 is formed into a substantially rectangular parallelepiped, and a rotary ring 9 integrally secured to the rear surface of the digital indicator 7 is rotatably coupled into a round hole 8 formed in the surface 6A of the casing 6, whereby the digital indicator 7 is rotatably mounted, being centered about the lock 10 guards against dislodging. the rotary ring 9, and ring-shaped leaf spring 11 is interposed between the lock 10 and the rear surface of the surface 6A of the casing 6, for biasing the rotary ring 9 inwards into the casing 6, so that the digital indicator 7 can be held at a desired position of rotation by the resultant frictional forces.

A circularly arcuate groove 12 centered about the central axis of the round hole 8 and is formed on the surface 6A of the casing 6, around the round hole 8 and at a position opposed to the rear surface of the rotary ring 9.

Furthermore, as shown in FIG. 4, secured to a position on the aforesaid rotary ring 9, which is opposed to the circularly arcuate groove 12, is a sliding pin 14 biased by a spring 13 to project into the circularly arcuate groove 12, so that the rotary ring 9 and the digital indicator 7 integrally formed with the rotary ring 9 can rotate within the range, of the circularly arcuate groove 12.

As shown in FIG. 1, the circularly arcuate groove 12 starts from a position where the top portion of the digital indicator 7 is located at the forward end of the spindle 3 to a position where the top portion of the digital indicator 7 is rotated through 90° in the clockwise direction (a range indicated by a double-headed arcuate line A) or through 90° in the counterclockwise direction (a range indicated by a double-headed arrow arcuate line B).

As shown in FIG. 2, the thimble 1 is secured to the right end portion of a feed screw 2A of the feed screw mechanism 2 as shown in the drawing so as to be rotatable integrally with the feed screw 2A which is formed at the inner end of the spindle 3, and threadably coupled to internal threads 2B, which constitute the aforesaid screw feed mechanism 3 with the feed screw 2A, whereby the spindle 3 is reciprocated in accordance with the direction of rotation of the thimble 1 during rotation of the thimble 1.

FIG. 2 shows is a spring 15 for biasing the spindle 3 towards a inner end thereof to eliminate a backlash formed between the feed screw 2A and the internal threads 2B, and a knob 16 mounted on an end portion of thimble 1, to rotate thimble 1.

The displacement detector 4 is mounted in a manner to be rotatable integrally with feed screw 2A, and comprises a main scale 17 formed of a thin disc, in which an optical lattice is formed radially, a stationary index scale 18 parallel to the main scale 17 with an optical lattice radially arranged similarly to the main scale 17, and a detecting portion 19 constituted by a light-emitting element and a light-receiving element, which are interposed between main scale 17 and index scale 18.

In FIG. 2 digital indicator 7 causes a liquid crystal indicator plate 20 to digitally indicate a detected displacement value in response to a signal fed from the operational means 5 which is connected by wiring 21 to the displacement detector 4 which is attached by screw 23 to casing 6 which receives electrical power from battery 22. In FIG. 1 the digital indicator 7 comprises ON-OFF button 24 together with the liquid crystal indicator plate 20, an inch-millimeter indication converter button 25, a zero-set button 26 an a button for direct reading 27.

The mode of action of the above embodiment will now be described with reference to FIG. 5.

The indication type micrometer heads M are used with a mount 28 on which is mounted a workpiece being measured in the projector (all of which are not shown). For driving the mount 28 and measuring a displacement, for example, the micrometer heads M are secured to the X axis and the Y axis as shown in FIG. 5.

In this case, when the worker is positioned at the side of the micrometer head My on the Y axis, the digital indicator 7 of the micrometer head Mx on the X axis is turned through 90° in the clockwise direction from the configuration shown in FIG. 1.

Figure 5:
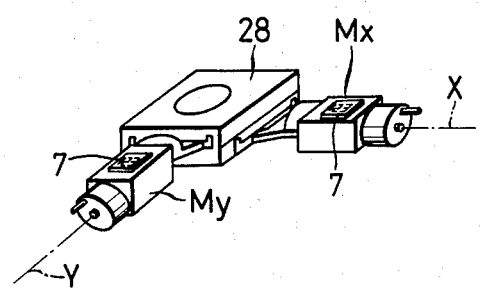
FIG. 5 is a perspective view showing the aforesaid embodiment in use.

Then the numerical values shown in the digital indicators 7 in the micrometer heads My and Mx take the normal position in looking from micrometer head My at the side of the forward end of the spindle 3 as shown in FIG. 5. Now the worker can easily read the numerical values without misreading.

Similary, when the worker stands at the side of the micrometer head Mx on the X axis, the digital indications 7 of the two micrometer heads My and Mx may be rotated to the directions where the worker can easily read the numerical values.

In this embodiment, the digital indicators 7 may take desired positions perpendicular to each other along the surfaces of the casing 6 of the micrometer heads M, whereby, in the case of using the micrometer heads on the amount of the projector for example, the micrometer heads for the X axis and the Y axis can be interchanged, and further, the digital indicators 7 may be changed in direction depending upon the position of the measurer. Moreover, the range of rotation of the digital indicator 7 is confined to the angular range of 90° in both the clockwise and counterclockwise directions, from the relationship between the circularly arcuate groove 12 and the sliding pin 14, so that the wiring 21 interconnecting the digital indicator 7, the operational means 5 formed integrally therewith and the displacement indicator 4 may not be twisted off.

Figure 6:
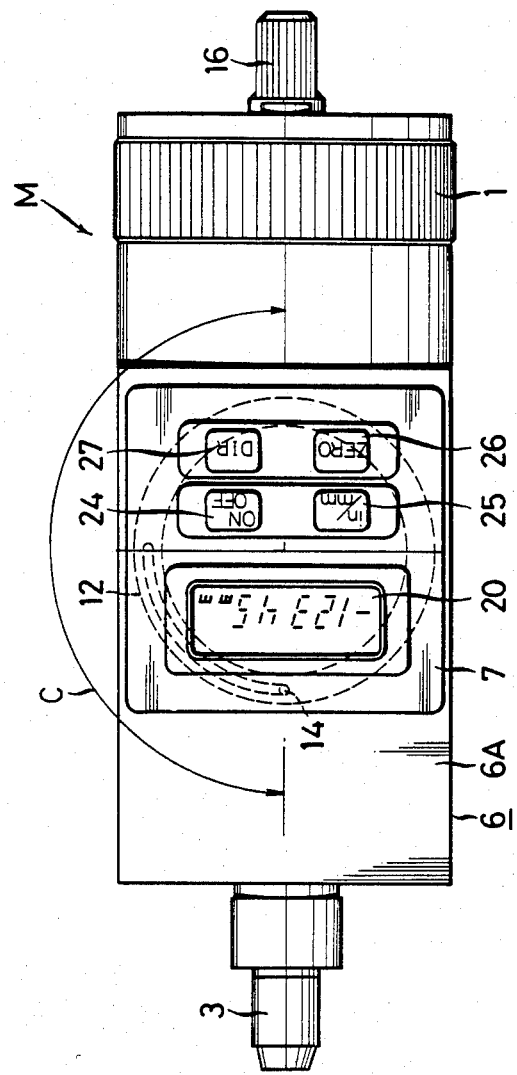
FIG. 6 is a plan view showing another embodiment of the micrometer according to the present invention.

Another embodiment is shown in FIG. 6 where, the swingable angular range of the digital indicator 7 is 180° from the normal position on the X axis in the clockwise direction, based on the relationship between the circularly arcuate groove 12 and the sliding pin 14 (a range indicated by the double-headed arrow arcuate line C). However, the digital indicator 7 may be swingable through 180° instead of the counterclockwise direction in the clockwise direction. This extended range requires the wiring 21 to be suitable in length and configuration so that it is free from being twisted off.

Figure 7:
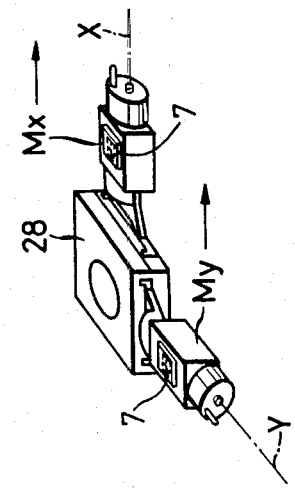
FIG. 7 is a perspective view showing the second embodiment in use.

In this case, the advantage can be offered that the range of positions of the digital indicator 7 is expanded depending upon the measuring positions of The application of the 180° rotation embodiment is shown in FIG. 7 which is similar to FIG. 5 except that the measuerer is looking in the direction of the Mx and My arrows in FIG. 7. Here the digital indicator 7 on the micrometer Mx is rotated 180° from its normal position, and digital indicator 7 on micrometer My is rotated 90° clockwise from its normal position. The result is that the worker when facing in the direction of the aforesaid arrows can easily read the numerical values without misreading.

It should be apparent of those skilled in the art that the abovedescribed embodiments are merely representative, of the applications of the principles of the present invention. Numerous and varied other arrangements can be readily devised by those skilled in the art without departing from the spirit and the scope of the invention.

What is claimed is:

1. A digital indication type micrometer head comprising: a spindle made displaceable in the axial direction thereof by rotation of a thimble through a screw feed mechanism; a displacement detector for detecting displacement values of said spindle; and operational means for processing detection signals emitted from said displacement detector and calculating a digital indication value; and a digital indicator secured rotatably to a surface of a casing for indicating the result of calculation of said operational means so that said digital indicator can take a normal position with a portion thereof at the side of the forward end of the spindle being disposed upwardly and a position or positions rotated through substantially 90° from said normal position.

2. A digital indication type micrometer head as set forth in claim 1, wherein a circularly arcuate groove centered about the rotary center axis of the digital indicator is formed on one of either the rear surface of the digital indicator or the surface of the casing opposed to said rear surface, and a sliding pin projecting into the circularly arcuate groove and being slidable therein is provided on the other.

3. A digital indication type micrometer head as set forth in claim 2, wherein the directions rotated from said normal position with the portion of the digital indicator at the side of the forward end of the spindle being disposed upwardly include the clockwise direction and the counterclockwise direction.

4. A digital indication type micrometer head as set forth in claim 3, wherein the swingable angular range of the digital indicator is made to be 180° from the normal position with the portion of the digital indicator at the side of the forward end of the spindle being disposed upwardly.

5. A digital indication type micrometer head as set forth in claim 4 wherein there is provided a ring-shaped spring biasing said casing and said digital indicator in a direction where both members are pressed against each other, whereby frictional forces are generated in directions of rotation relative to each other.

6. A digital indication type micrometer head as set forth in claim 3 wherein there is provided a ring-shaped spring biasing said casing and said digital indicator in a direction where both members are pressed against each other, whereby frictional forces are generated in directions of rotation relative to each other.

7. A digital indication type micrometer head as set forth in claim 2, wherein the swingable angular range of the digital indicator is made to be 180° from the normal position with the portion of the digital indicator at the side of the forward end of the spindle being disposed upwardly.

8. A digital indication type micrometer head as set forth in claim 7 wherein there is provided a ring-shaped spring biasing said casing and said digital indicator in a direction where both members are pressed against each other, whereby frictional forces are generated in directions of rotation relative to each other.

9. A digital indication type micrometer head as set forth in claim 2, wherein there is provided a ring-shaped spring biasing said casing and said digital indicator in a direction where both members are pressed against each other, whereby frictional forces are generated in directions of rotation relative to each other.

10. A digital indication type micrometer head as set forth in claim 1, wherein the directions rotated from said normal position with the portion of the digital indicator at the side of the forward end of the spindle being disposed upwardly include the clockwise direction and the counterclockwise direction.

11. A digital indication type micrometer head as set forth in claim 10 wherein the swingable angular range of the digital indicator is made to be 180° from the normal position with the portion of the digital indicator at the side of the forward end of the spindle being disposed upwardly.

12. A digital indication type micrometer head as set forth in claim 11 wherein there is provided a ring-shaped spring biasing said casing and said digital indicator in a direction where both members are pressed against each other, whereby frictional forces are generated in directions of rotation relative to each other.

13. A digital indication type micrometer head as set forth in claim 10 wherein there is provided a ring-shaped spring biasing said casing and said digital indicator in a direction where both members are pressed against each other, whereby frictional forces are generated in directions of rotation relative to each other.

14. A digital indication type micrometer head as set forth in claim 1, wherein the swingable angular range of the digital indicator is made to be 180° from the normal position with the portion of the digital indicator at the side of the forward end of the spindle being disposed upwardly.

15. A digital indication type micrometer head as set forth in claim 14 wherein there is provided a ring-shaped spring biasing said casing and said digital indicator in a direction where both members are pressed against each other, whereby frictional forces are generated in directions of rotation relative to each other.

16. A digital indication type micrometer head as set forth in claim 1, wherein there is provided a ring-shaped spring biasing said casing and said digital indicator in a direction where both members are pressed against each other, whereby frictional forces are generated in directions of rotation relative to each other.

* * * * *